United States Patent [19]

Watanabe et al.

[11] 4,208,611
[45] Jun. 17, 1980

[54] FLUORESCENT LAMP CONTAINING A GREEN EMITTING RARE EARTH SILICATE COACTIVATED PHOSPHOR

[75] Inventors: Minoru Watanabe, Kawasaki; Toshio Nishimura, Yokohama; Tadao Omi, Yokohama; Kotaro Koomoto, Yokohama; Tomohiko Kobuya, Kawasaki; Kenichi Shimizu, Fujisawa, all of Japan

[73] Assignee: Tokyo Shibaura Electric Co., Ltd., Kawasaki, Japan

[21] Appl. No.: 895,804

[22] Filed: Apr. 12, 1978

[30] Foreign Application Priority Data

Apr. 13, 1977 [JP] Japan .................................. 52/42337

[51] Int. Cl.$^2$ ........................... C09K 11/46; H01J 1/63
[52] U.S. Cl. .............................. 313/487; 252/301.4 R; 252/301.4 P; 252/301.4 F; 313/486
[58] Field of Search .................. 252/301.4 R, 301.4 F, 252/301.4 P; 313/486, 487

[56] References Cited

U.S. PATENT DOCUMENTS

| | | | |
|---|---|---|---|
| 3,523,091 | 8/1970 | McAllister | 252/301.4 F |
| 3,758,413 | 9/1973 | Peters | 252/301.4 F |
| 3,858,082 | 12/1974 | Thornton | 313/487 |

FOREIGN PATENT DOCUMENTS

| | | | |
|---|---|---|---|
| 2035258 | 3/1972 | Fed. Rep. of Germany | 252/301.4 F |
| 48-83773 | 11/1973 | Japan . | |

OTHER PUBLICATIONS

Bondar et al. "Izvestia Akademia Nauk SSSR", vol. 33, No. 6, pp. 1057–1061.
Verstegen et al. I "J. Electrochem. Soc.", vol. 121, No. 12, 1974, pp. 1627–1631.
Blasse et al. "J. of Chem. Phys.", vol. 47, No. 6, 1967, pp. 1920–1926.
Verstegen et al. II "J. of Luminescence" 6, 1973, pp. 425–431.

Primary Examiner—Jack Cooper
Attorney, Agent, or Firm—Cushman, Darby & Cushman

[57] ABSTRACT

A rare earth silicate phosphor co-activated by cerium and terbium which is expressed by the general structural formula:

$$Ln_{2(1-x-y)}O_3 \cdot zSiO_2:Ce_{2x} \cdot Tb_{2y}$$

where:
Ln is at least one rare earth element selected from the group consisting of yttrium, lanthanum, gadolinium and lutetium,
x is $1 \times 10^{-3}$ to $3 \times 10^{-1}$ gram atom per gram atom of all the rare earth elements,
y is $3 \times 10^{-2}$ to $3 \times 10^{-1}$ gram atom per gram atom of all the rare earth elements,
z is 0.8 to 2.2 mol per mol of rare earth oxide,
and the phosphor efficiently emits green rays when excited by ultraviolet rays.

13 Claims, 11 Drawing Figures

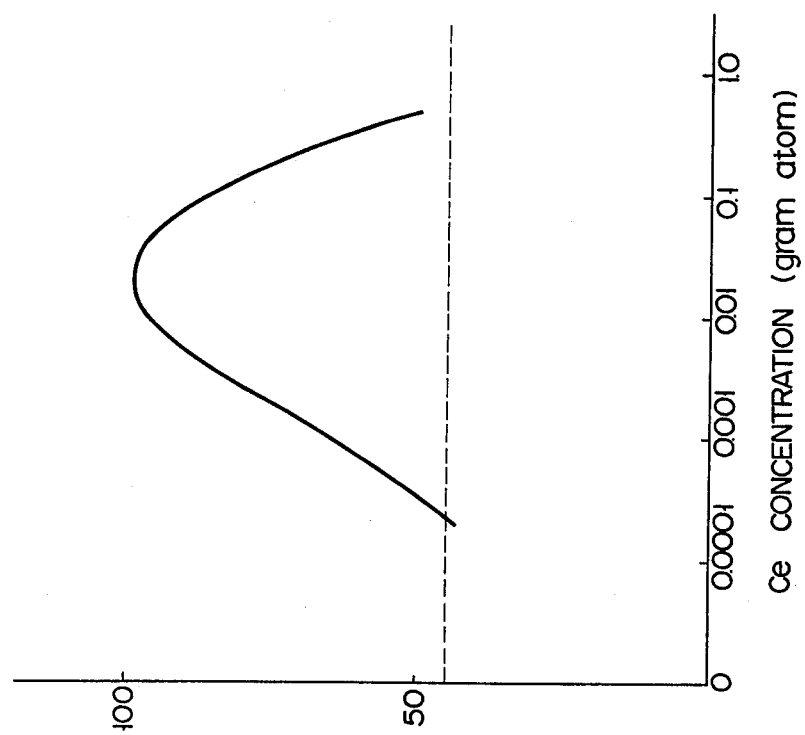
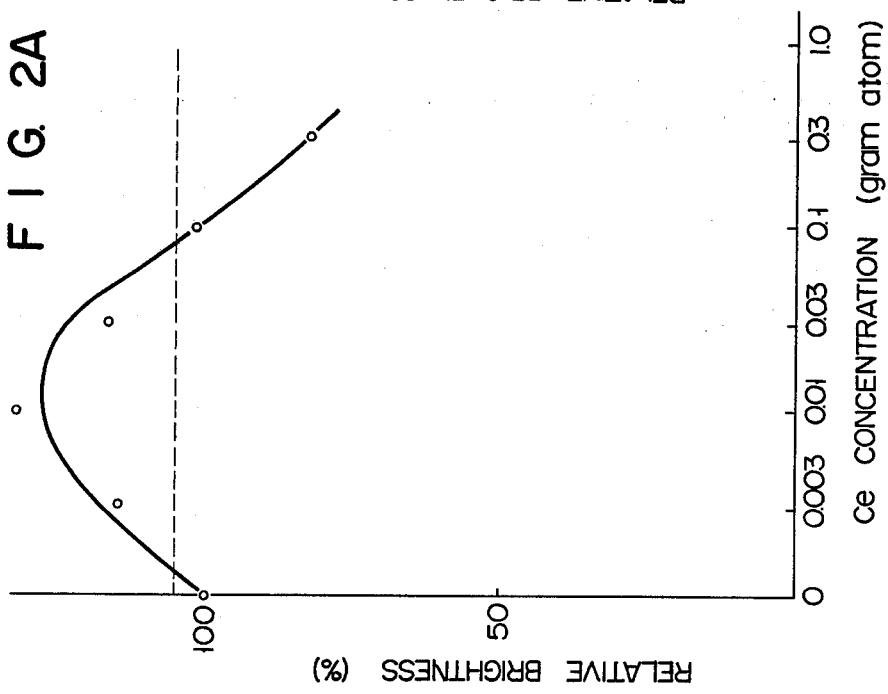

FLUORESCENT LAMP CONTAINING A GREEN EMITTING RARE EARTH SILICATE COACTIVATED PHOSPHOR

BACKGROUND OF THE INVENTION

This invention relates to a rare earth silicate phosphor co-activated by cerium and terbium, which, when excited by ultraviolet rays, efficiently emits green rays.

Some phosphors activated by a rare earth element such as terbium are known to efficiently to emit green rays when excited by ultraviolet rays having a particular wavelength range. The green rays thus emitted are found to have a line spectrum pattern. The U.S. Pat. No. 3,523,091 sets forth lanthanum silicate, yttrium silicate and lanthanum-yttrium silicate all activated by terbium. British Patent No. 1,452,083 describes that a terbium-activated aluminate phosphor, for example, $(Ce.Tb)MgAl_{11}O_{19}$ efficiently emits green rays when excited by ultraviolet rays. An excitation spectrum of the prior art phosphor has a peak in the proximity of a wavelength of 254 nanometers (hereinafter abbreviated as "nm") or 300 nm. The peak extends over a relatively narrow region, and excitation efficiency particularly at a wavelength of 365 nm is noticeably low.

Minoru Watanabe, one of the present inventors, previously proposed in the Japanese patent application disclosure No. 83,773/1973 a flying spot scanner tube whose phosphor layer is composed of yttrium silicate co-activated by cerium and terbium. The phosphor used with the proposed scaner tube is of a different type in that the previously proposed phosphor emits a light when excited by electron beams.

The disclosed literature only sets forth a flying spot scanner tube using a phosphor which emits a light when excited by electron beams, and makes no reference to a phosphor which, when excited by ultraviolet rays, emits green rays and is particularly adapted for use with a fluorescent lamp.

It is accordingly an object of this invention to provide a phosphor capable of efficiently emitting substantially green visible rays when excited by ultraviolet rays.

Another object of the invention is to provide a rare earth silicate phosphor whose excitation spectrum has a peak at both wavelength of 253.7 nm and 365 nm.

Still another object of the invention is to provide various types of fluorescent lamp which display high efficiency and high color rendering due to application of the rare earth silicate phosphor.

SUMMARY OF THE INVENTION

The above-mentioned objects can be attained by a green ray-emitting rare earth silicate phosphor co-activated by cerium and terbium which is expressed by the general structural formula:

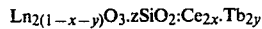

$$Ln_{2(1-x-y)}O_3.zSiO_2:Ce_{2x}.Tb_{2y}$$

where:
- Ln is at least one rare earth element selected from the group consisting of yttrium, lanthanum, gadolinium and lutetium,
- x is $1 \times 10^{-3}$ to $3 \times 10^{-1}$ gram atom per gram atom of all the rare earth elements,
- y is $3 \times 10^{-2}$ to $3 \times 10^{-1}$ gram atom per gram atom of all the rare earth elements,
- z is 0.8 to 2.2 mol per mol of rare earth oxide included in said phosphor, and efficiently emits green rays when excited by ultraviolet rays.

BRIEF DESCRIPTION OF THE DRAWINGS

This invention can be more fully understood from the following detailed description when taken in conjunction with the accompanying drawings, in which:

FIG. 2A is a graph showing the relationship between the gram atom of Ce per gram atom of the total amount of all the rare earth elements constituting the phosphor of this invention and the relative brightness of said phosphor when excited by ultraviolet rays having a wavelength of 253.7 nm;

FIG. 2B is a graph showing the relationship between the gram atoms of Ce per gram atom of the total amount of all the rare earth elements constituting the phosphor of the invention and the relative brightness of said phosphor when excited by a high pressure type mercury lamp;

DETAILED DESCRIPTION OF THE DRAWINGS

The phosphor of this invention is formed of rare earth silicate co-activated by the prescribed amounts of Ce and Tb, and very efficiently emits green rays when excited by ultraviolet rays whose wavelengths lie within a broad range. Therefore, the phosphor of the invention whose excitation spectrum has high peaks at wavelength regions of about 250 nm, about 305 nm and 365 nm displays a prominently high efficiency. The reason for this advantageous effect is believed to be that the energy of ultraviolet rays absorbed in the activator $Ce^{3+}$ is transmitted to the activator $Tb^{3+}$, thereby elevating the intensity of green rays emitted.

A rare earth element constituting the matrix of the phosphor of this invention may be at least any one of the group consisting of yttrium, lanthanum, gadolinium and lutetium.

There will now be described the range of the values of the coefficients x, y, z given in the aforesaid general structural formula of the phosphor of the invention.

Figure 1:
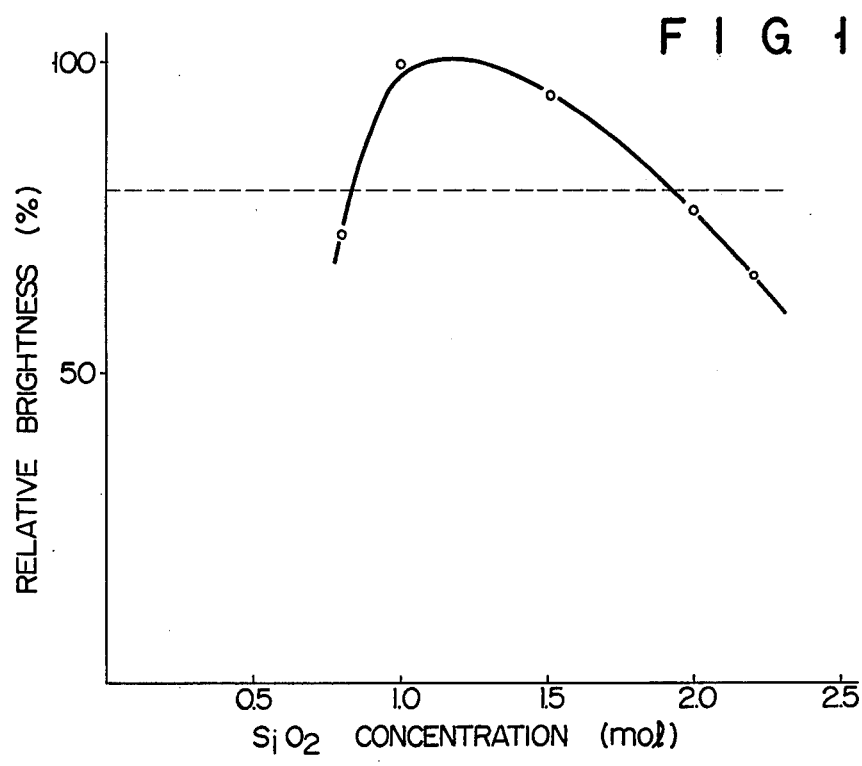
FIG. 1 is a graph showing the relationship between $SiO_2$ concentration (expressed in mol) per mol of a rare earth oxide included in the phosphor of this invention and the relative brightness of said phosphor when excited by ultraviolet rays.

The amount of $SiO_2$ per mol of the rare earth oxide included in the phosphor of this invention ranges between 0.8 to 2.2 mol. FIG. 1 indicates the relative brightness of the phosphor of the invention when excited by ultraviolet rays with the mole number z of the $SiO_2$ varied relative to said phosphor having a composition expressed as

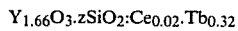
$Y_{1.66}O_3 \cdot zSiO_2:Ce_{0.02} \cdot Tb_{0.32}$ when the values of the coefficients x, y are set at 0.01 and 0.16 respectively. For reference, the broken line of FIG. 1 shows the relative brightness of a phosphor $(Ce.Tb)MgAl_{11}O_{19}$ having the highest brightness among the prior art phosphors emitting green rays when excited by ultraviolet rays. The practical amount of $SiO_2$ ranges between 0.8 and 2.2 mol, or preferably 0.8 and 1.9 per mol of the rare earth oxide included in the present phosphor.

FIGS. 2A and 2B respectively set forth the relative brightness of the present phosphor having a composition expressed as

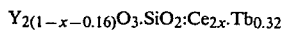
$Y_{2(1-x-0.16)}O_3 \cdot SiO_2:Ce_{2x} \cdot Tb_{0.32}$ when excited by ultraviolet rays mainly having the wavelengths of 253.7 nm and 365 nm, respectively, with the gram atom of Ce varied per gram atom of the total amount of Y, Ce and Tb. For reference, the broken lines of FIGS. 2A and 2B show the relative brightness of the conventional phosphor $(Ce.Tb)MgAl_{11}O_{19}$ when excited by ultraviolet rays respectively described above. With the green ray-emitting phosphor of this invention, the practicable concentration x of Ce ranges between $1 \times 10^{-3}$ and $3 \times 10^{-1}$ gram atom, or preferably between $3 \times 10^{-3}$ and $1 \times 10^{-1}$ gram atom.

Figure 3:
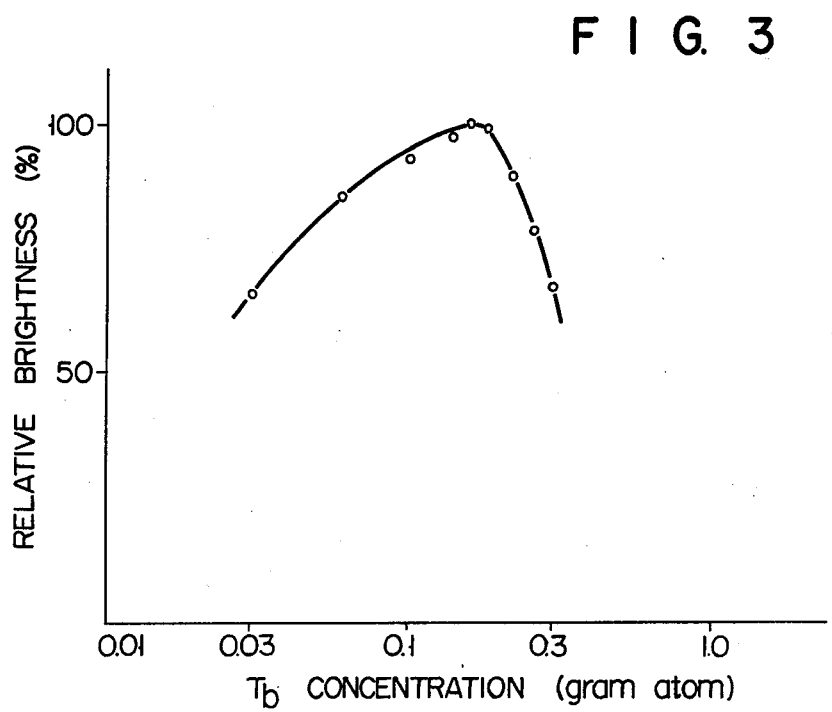
FIG. 3 is a graph showing the relationship between the gram atom of Tb per gram atom of the total amount of all the rare earth elements constituting the phosphor of the invention and the relative brightness of said phosphor when excited by ultraviolet rays.

FIG. 3 illustrates the relative brightness of the phosphor of the invention whose composition is expressed as

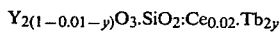
$Y_{2(1-0.01-y)}O_3 \cdot SiO_2:Ce_{0.02} \cdot Tb_{2y}$ when excited by ultraviolet rays with the gram atom of Tb varied per gram atom of the total amount of Y, Ce and Tb. FIG. 3 shows that the practical concentration y of Tb ranges between $3 \times 10^{-2}$ and $3 \times 10^{-1}$ gram atom, or preferably between $5 \times 10^{-2}$ and $2.5 \times 10^{-1}$ gram atom.

Figure 4:
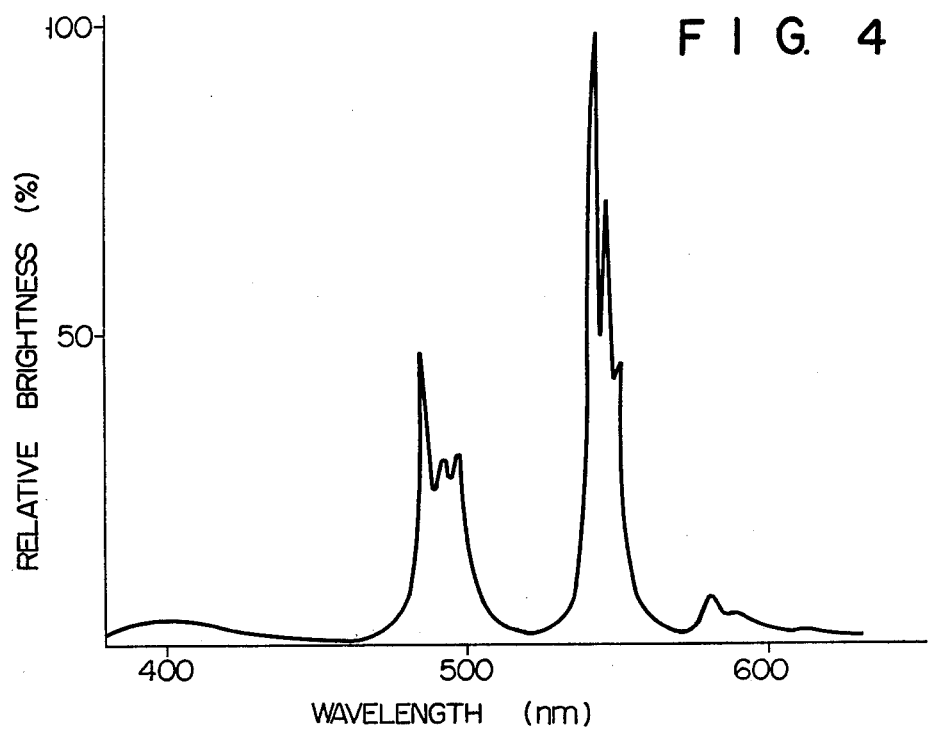
FIG. 4 is a spectrum of light emitted from the phosphor of the invention when excited by ultraviolet rays.

FIG. 4 sets forth the spectrum of green rays emitted by a specific example of the present phosphor having a composition expressed as

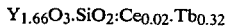
$Y_{1.66}O_3 \cdot SiO_2:Ce_{0.02} \cdot Tb_{0.32}$ when excited by ultraviolet rays. The abscissa of FIG. 4 shows the wavelength of emission spectrum and the ordinate indicates the relative brightness of said spectrum. As seen from FIG. 4, the emission spectrum has peaks at two wavelength regions ranging between 480 and 500 nm as well as between 540 and 550 nm. Green rays having the highest peak at the wavelength region ranging between 540 and 550 nm display good visibility and prove suitable for use with a green ray emitted by a fluorescent lamp.

Figure 5:
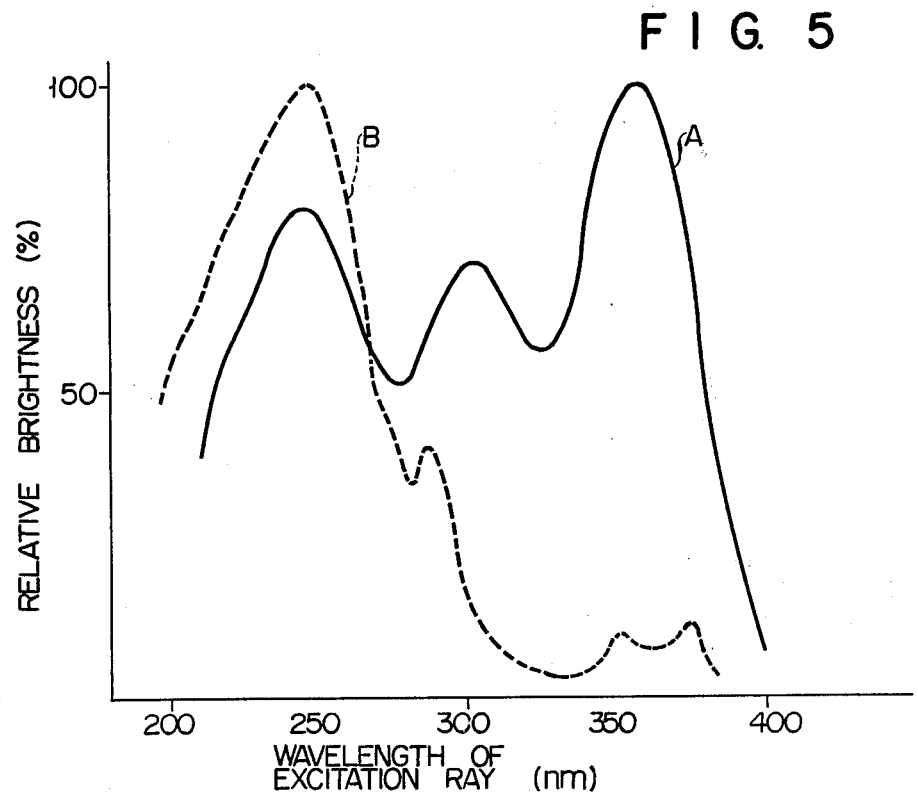
FIG. 5 sets forth the excitation spectrum of the phosphor of the invention (A) and that of the prior art phosphor activated by Tb alone (B), respectively.

FIG. 5 illustrates the excitation spectrum of the same phosphor as that of FIG. 4, with the wavelengths of exciting ultraviolet rays plotted on the abscissa and the relative brightness of green rays emitted by the phosphor shown on the ordinate. For reference, the broken line of FIG. 5 shows the excitation spectrum of the prior art phosphor whose composition is expressed as

$Y_{1.68}O_3 \cdot SiO_2:Tb_{0.32}$

As shown in FIG. 5, the excitation spectrum of the phosphor of this invention has three peaks at each wavelength of about 250 nm, about 305 nm and about 360 nm, whereas the excitation spectrum of the above-mentioned prior art phosphor has a peak only at a wavelength of about 250 nm. It is seen therefore, that the phosphor of this invention is adapted for use not only with a low pressure mercury fluorescent lamp but also a high pressure mercury fluorescent lamp.

The foregoing description refers to the case where the rare earth element constituting the matrix of the phosphor of this invention was only yttrium. However, the same description is applicable to the case where the rare earth element constituting the matrix is at least one member of the group consisting of yttrium, lanthanum, gadolinium and lutetium. All these rare earth elements display substantially the same properties as illustrated in FIGS. 4 and 5, when applied to the matrix of the present phosphor.

There will now be described the process of manufacturing the phosphor of this invention. The phosphor can be prepared by co-activating a rare earth silicate used as the matrix by Tb anc Ce. Implantation of Tb and Ce in the matrix is effected, for example, in the form of $Tb_4O_7$ and $CeO_2$ respectively. Firing is undertaken in a reducing atmosphere formed of hydrogen or a slightly reducing atmosphere such as $N_2\text{-}H_2$ or $N_2\text{-}H_2\text{-}C$. The useful flux consists of halogenated alkali such as KF, LiBr, LiCl and LiF or $ZnF_2$, $AlF_3$, $MgF_2$, $BaF_2$, $LaF_3$, $YF_3$ and $GdF_3$. The flux can be used in an amount up to 0.3 mol per mol of all the rare earth oxides.

DESCRIPTION OF THE PREFERRED EMBODIMENTS

This invention will be more fully understood by reference to the examples which follow.

EXAMPLE 1

0.83 mol of $Y_2O_3$, 0.02 mol of $CeO_2$ and 0.08 mol of $Tb_4O_7$ were dissolved in concentrated nitric acid and water was added to the resultant solution. 3.6 l of 1 mol oxalic acid solution was mixed with the water-diluted nitric acid solution containing yttrium, cerium and terbium, followed by stirring and heating to a temperature of about 80° C. The oxalates of yttrium, cerium and terbium were subjected to co-precipitation. The precipitate was allowed to stand about 30 minutes at said temperature. Though not rigidly defined, a precipitation temperature of about 80° C. well serves the purpose. The precipitated mixture was washed with demineralized water, followed by drying. The oxalate was heated about an hour at a temperature of 1,000° to 1,100° C. to be converted into an oxide. The oxide was mixed with 1.01 mol of $SiO_2$ and then with 0.08 mol of KF. The mixed mass was uniformly crushed. The crushed mixed mass was fired 2 to 5 hours in a slightly reducing atmosphere formed of, for example, a combination of nitrogen and hydrogen at a temperature of 1,000° to 1,300° C. The fired phosphor was pulverized into fine powder. The powder was again fired in the same atmosphere. The finished phosphor had a composition expressed as $$Y_{1.66}O_3 \cdot SiO_2:Ce_{0.02} \cdot Tb_{0.32}$$

and when excited by ultraviolet rays, emitted intense green rays.

EXAMPLE 2

0.88 mol of $Y_2O_3$, 0.04 mol of $CeO_2$, 0.05 mol of $Tb_4O_7$ and 1 mol of $SiO_2$ were mixed. An aqueous solution of 0.04 mol of LiBr was added to the mixture, followed by thorough stirring. The mixed mass was dried and then fired 2 to 4 hours at a temperature of 1,300° to 1,350° C. in the same slightly reducing atmosphere as used in Example 1. The phosphor obtained was fired once more at the same condition. The finished phosphor had a composition expressed as $$Y_{1.76}O_3 \cdot SiO_2:Ce_{0.04} \cdot Tb_{0.2}$$

and showed the same spectrum of emitted rays as in FIG. 4 and the excitation spectrum as in FIG. 5.

EXAMPLE 3

0.69 mol of $Y_2O_3$, 0.2 mol of $Gd_2O_3$, 0.02 mol of $CeO_2$ and 0.05 mol of $Tb_4O_7$ were uniformly mixed with 2 mol of $SiO_2$ and 0.2 mol of $ZnF_2$. The mixture was fired 2 to 5 hours at a temperature of 1,200° to 1,350° C. in a reducing atmosphere, and thereafter fired again at the same condition. The finished phosphor had a compositon expressed as $$Y_{1.38}Gd_{0.4}O_3 \cdot 2SiO_2:Ce_{0.02} \cdot Tb_{0.2}$$

and displayed the same spectrum of emitted rays as in FIG. 4 and the same excitation spectrum as in FIG. 5.

EXAMPLE 4

0.7 mol of $La_2O_3$, 0.1 mol of $Lu_2O_3$, 0.2 mol of $CeO_2$, 0.05 mol of $Tb_4O_7$, 1.2 mol of $SiO_2$ and 0.4 mol of $LaF_3$ were mixed, followed by crushing. The mixture was fired 2 to 5 hours at a temperature of 1,300° to 1,400° C. in a reducing atmosphere. The phosphor obtained was pulverized into fine powder, and again fired at the same temperature. The finished phosphor had a composition expressed as $$La_{1.4}Lu_{0.2}O_3 \cdot 1.2SiO_2:Ce_{0.2} \cdot Tb_{0.2}$$

and indicated the same spectrum of emitted rays as in FIG. 4 and the same excitation spectrum as in FIG. 5.

When used with the phosphor of this invention, ultraviolet rays are allowed to have a broad range of wavelength capable of causing said phosphor efficiently to emit green rays. Therefore, the present phosphor is widely applicable for use with various types of fluorescent lamp requiring a green ray-emitting element. These fluorescent lamps include a low pressure mercury fluorescent lamp provided with elements emitting rays of three primary colors, a fluorescent lamp only provided with a green light-emitting element for use with an electronic copying apparatus and a high pressure mercury fluorescent lamp.

Figure 6:
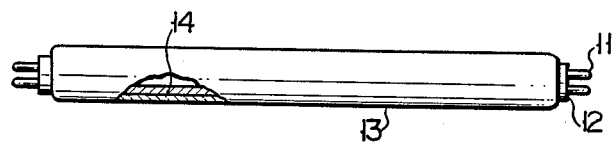
FIG. 6 illustrates a partly exploded low pressure mercury fluorescent lamp.

A low pressure mercury fluorescent lamp comprises, as shown in FIG. 6, a glass tube 13 which is sealed at both ends with a base member 12 fitted with a leadout pin 11, and filled with mercury vapor and rare gas, and on the inner wall of which a phosphor layer 14 is mounted. The phosphor layer 14 is formed of a mixture of three phosphors emitting red, green and blue rays respectively. When excited by ultraviolet rays generated in mercury vapor by electric discharge, these phosphors emit visible rays.

The above-mentioned general purpose low pressure mercury fluorescent lamp is required to display high efficiency and color rendering.

The efficiency of a light source is generally determined by the rate of conversion from electric input into radiation and the visibility of rays emitted from said light source. The low pressure mercury fluorescent lamp has a higher efficiency, where ultraviolet rays are converted into visible rays at a larger rate and converted rays have wavelengths more approaching a region of higher visibility. For example, a widely accepted illumination fluorescent lamp provided with a phosphor layer including a green ray-emitting phosphor prepared from calcium halophosphate has an efficiency of 80 lm/w at a color temperature of 4,200° K.

On the other hand, the color-rendering can be elevated by a combination of emissions of three different wavelengths. Accordingly, a first phosphor emitting blue rays having a wavelength of 430 to 490 nm, a second phosphor emitting green rays having a wavelength of 520 to 590 nm and a third phosphor emitting red rays having a wavelength of 590 to 640 nm all combined in the proper quantities provide a light source whose general color-rendering Ra increases over 80 at a color temperature ranging between 2,300° and 7,000° K. Where provided with three different phosphors admitting of a high rate of conversion from ultraviolet rays into visible rays and displaying an emission spectrum having a narrow half-width, a fluorescent lamp increases in general color rendering and efficiency. A phosphor which emits rays having a wavelength of 430 to 490 nm or a wavelength of 590 to 640 nm, but whose emission spectrum has a broad half-width tends to issue a large amount of rays whose wavelength falls outside of the range of about 400 to about 700 nm. Rays having other wavelengths than those of high visibility make no contribution to improvement on efficiency and color rendering and, therefore, are regarded as useless. On the other hand, the wavelength of 520 to 590 nm of rays emitted by a phosphor do not fall outside of the high visibility range, even if the emission spectrum of said phosphor has a relatively broad half-width. Since, however, a wavelength of highest visibility lies near 550 nm, a broad half-width causes wavelengths to be more prominently displaced from the proximity of said optimum wavelength range. With the low pressure mercury fluorescent lamp, therefore, the half-width of the emission spectrum of rays emitted from a phosphor bears great importance.

The half-width is desired to be less than 100 nm for the respective wavelength ranges, or preferably less than 50 nm. Further, the half-width should be less than 25 nm, if a phosphor is desired to have optimum properties. From the above consideration, the phosphor of this invention has proved useful for the low pressure mercury fluorescent lamp as the second phosphor of the phosphor layer emitting rays whose wavelength ranges between 520 to 590 nm.

The first and third phosphors of a phosphor layer used with the low pressure mercury fluorescent lamp may consist of the conventional types. The first phosphor should preferably consist of any of the divalent europium-activated phosphors expressed by the following general structural formulas:

$Sr_5(PO_4)_3Cl:Eu$ (a)

$Ba_xMg_{(2-x)}Al_{16}O_{27}:Eu$ ($0.5 \leqq X \leqq 1.5$) (b)

$Sr_xMg_{(2-x)}Al_{16}O_{27}:Eu$ ($0.5 \leqq X \leqq 1.5$) (c)

the third phosphor may consist of any of the trivalent europium-activated phosphors expressed by the following general structural formula:

$Ln_2O_3:Eu$ (Ln representing any of Y, Gd and Lu)

The first, second and third phosphors should preferably be mixed in the proportions of 5 to 30% by weight, 10 to 60% by weight and 20 to 80% by weight respectively.

There will now be described a specific example of a low pressure mercury fluorescent lamp wherein the second phosphor emitting green ray of the phosphor layer is formed of the phosphor of this invention.

Three different composite phosphors a, b, c were provided by mixing $BaMg_2Al_{16}O_{27}:Eu$ used as a first phosphor emitting blue rays having a maximum emission within wavelength range of 430 to 490 nm; $Y_{1.66}O_3.SiO_2:Ce_{0.02}.Tb_{0.32}$ used as a second phosphor emitting green rays having a maximum emission within wavelength range of 520 to 590 nm; and $Y_2O_3:Eu$ used as a third phosphor emitting red rays having a maximum emission within wavelength range of 590 to 640 nm. All these components were blended in the proportions given in Table 1 below to provide the respective composite phosphor.

Table 1

| Composite phosphor | First phosphor $BaMg_2Al_{16}O_{27}:Eu$ | Second phosphor $Y_{1.66}O_3 . SiO_2:Ce_{0.02} . Tb_{0.32}$ | Third phosphor $Y_2O_3:Eu$ |
|---|---|---|---|
| a | 9% | 28% | 63% |
| b | 19% | 33% | 48% |
| c | 25% | 30% | 45% |

Three different low pressure mercury fluorescent lamps A, B, C were manufactured by using the above-mentioned three different composite phosphor respectively. The properties of the three fluorescent lamps A, B, C are set forth in Table 2 below, together with those of a fluorescent lamp used as a control.

Table 2

| Fluorescent lamp | Tk | Ra | Zero hr lm/w |
|---|---|---|---|
| A | 3,200 | 85 | 80.5 |
| B | 4,200 | 85 | 82.5 |
| C | 5,000 | 87 | 81.0 |
| Control | 4,200 | 64 | 80.0 | where:
Tk = color temperature (°K.),
Ra = general color-rendering,
Zero hr lm/w = initial efficiency.

The lamp used as a control consisted of the ordinary white light fluorescent lamp having a color temperature of 4,200° K. in which the second phosphor was prepared from calcium halophosphate. Table 2 above shows that the fluorescent lamps A, B, C have about the same efficiency as, and a higher color-rendering, than the control.

Figure 10:
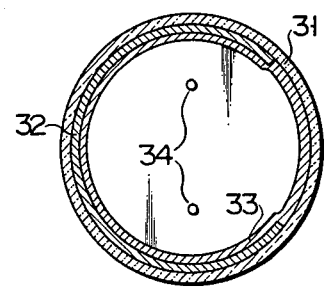
FIG. 10 is a schematic cross sectional view of a single green ray-emitting fluorescent lamp used with an electronic copying apparatus.

The low pressure mercury fluorescent lamp is also used as a single green ray-emitting lamp with an electronic copying apparatus. This single green ray-emitting fluorescent lamp comprises, as shown in FIG. 10, a cylindrical glass bulb 31, on the inner surface of which a reflection layer 32 is formed, except for an aperture extending lengthwise of said glass bulb 31, and in which a green ray-emitting phosphor 33 is deposited on the reflection layer 32 and the aperture. The phosphor 33 emits green rays when excited by ultraviolet rays generated by electric discharge occurring across electrodes 34 in mercury vapors received in the lamp. The green rays are collected by the reflection layer 32 to be sent forth to the outside through the aperture.

The green ray-emitting phosphor having a maximum emission within wavelength range of 520 to 590 nm, and is customarily prepared from manganese-activated zinc silicate $Zn_2SiO_4:Mn$ or in recent years from terbium-activated cerium-magnesium aluminate $(Ce.Tb)MgAl_{11}O_{19}$. However, the requirement has been made to develop a green ray-emitting phosphor producing a high light output and displaying a prominent light output maintenance characteristic. The rare earth silicate phosphor of this invention activated by cerium and terbium now has been found suitable for use with the single green ray-emitting lamp in an electronic copying apparatus.

Comparison was made between the properties of a single green ray-emitting fluorescent lamp provided with the phosphor of this invention having a composition of $Y_{1.66}O_3.SiO_2:Ce_{0.02}.Tb_{0.32}$ and those of a similar lamps provided with the prior art phosphors, the results being set forth in Table 3 below.

Table 3

| Phosphor used | Properties | Zero hr Output (cd) | 100 hr Output (cd) | 100 hr Maintenance rate (%) | 200 hr Output (cd) | 200 hr Maintenance rate (%) |
|---|---|---|---|---|---|---|
| $Y_{1.66}O_3 . SiO_2 : Ce_{0.02} . Tb_{0.32}$ | | 368 | 313 | 85 | 295 | 80 |
| $Zn_2SiO_4 :Mn$ | | 330 | 231 | 70 | 188 | 57 |
| $(Ce . Tb)MgAl_{11}O_{19}$ | | 335 | 278 | 83 | 258 | 77 |

Table 3 shows that the phosphor of this invention increases about 12% in light output (cd) and 23% in maintenance rate after 200 hr over the prior art $Zn_2SiO_4:Mn$ phosphor; and also about 9% in light output and 3% in maintenance rate over the prior art $(Ce.Tb)MgAl_{11}O_{19}$ phosphor.

Tests were made on the above-mentioned three fluorescent lamps when used with a CANON NP-L5 type electronic copying apparatus already put into practical application, the results being presented in Table 4.

Table 4

| Phosphor used | Relative brightness over the drum (%) | Copy test |
|---|---|---|
| $Y_{1.66}O_3 . SiO_2 : Ce_{0.02} . Tb_{0.32}$ | 130 | Very good |
| $Zn_2SiO_4 : Mn$ | 100 | Good |
| $(Ce . Tb)MgAl_{11}O_{19}$ | 128 | Very good |

The copy test relates to visual evaluation of a copy obtained from a blue print manuscript. The phosphor of this invention whose main wavelength indicated about 545 nm and was drawn nearer to the longer wavelength region than that of the prior art green ray-emitting phosphor, enabled a more distinct copy to be produced.

High pressure mercury fluorescent lamps are widely used for general illumination purposes. In recent years, the indoor illumination versions of such fluorescent lamps have been required to exhibit high color-rendering.

Figure 7:
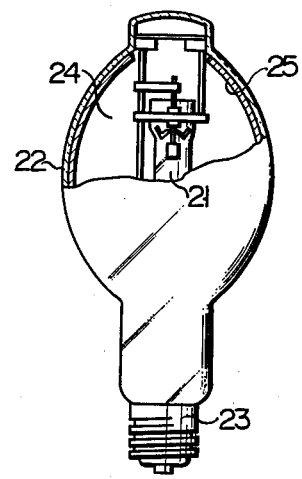
FIG. 7 shows a partly exploded high pressure mercury fluorescent lamp.

There will now be described by reference to FIG. 7 the construction of a general high pressure mercury fluorescent lamp.

A high pressure mercury discharge lamp tube 21 is enclosed in an envelope bulb 22. Both lamp tube 21 and bulb 22 are fixed together by a base member 23. The interior 24 of the envelope bulb 22 is evacuated, and filled with nitrogen gas or argon gas. A phosphor layer 25 mounted on the inner surface of the envelope bulb 22 emits light when excited by ultraviolet rays radiated from the discharge lamp tube 21. This phosphor layer 25 has a light permeability of about 96 to 98%. In this case, therefore, some portions of the radiated rays which are not absorbed in the envelope bulb 22 simply pass therethrough without contributing to the excitation of the phosphor layer 25. Eventually, the light of the high pressure mercury fluorescent lamp is actually constituted by a combination of the rays emitted from the phosphor by ultraviolet rays and uselessly passing rays.

A phosphor used with the high pressure mercury fluorescent lamp should meet the following three requirements:

(1) The phosphor efficiently should emit rays when excited by ultraviolet rays radiated from the high pressure mercury discharge lamp tube whose wavelengths mainly consist of 365 nm, 253.7 nm and 185.4 nm.

(2) The phosphor should be saved from deterioration in brightness at an ambient temperature of 200° to 300° C., namely, should be only slightly subject to deterioration at said ambient temperature.

(3) The spectrum of rays emitted from the phosphor has main wavelength regions adapted for visibility.

The prior art high pressure mercury fluorescent lamp is provided for good color-rendering with a phosphor layer formed of a combination of a green ray-emitting phosphor and a red-ray emitting phosphor, for example, $Y(P,V)O_4:Eu$ or $YVO_4:Eu$. However, the conventional high pressure mercury fluorescent lamp indicates an insufficient general color-rendering Ra of about 43 and a low efficiency of 60 lm/w at 400 W.

The phosphor of this invention has been proved to meet the above-mentioned three requirements and to be very effective as a green ray-emitting phosphor for use with the high pressure mercury fluorescent lamp.

The rare earth silicate phosphor co-activated by cerium and terbium according to this invention has a prominent property with respect to the aforesaid first requirement, namely, displays a far higher efficiency than the known green ray-emitting phosphor. Comparison was made between the properties of the present and prior art green ray-emitting phosphors, the results being set forth in Table 5 below.

Table 5

| Green ray-emitting phosphor used | Brightness under excitation by high pressure mercury discharge lamp |
|---|---|
| $Y_{1.66}O_3 \cdot SiO_2 : Ce_{0.02} \cdot Tb_{0.32}$ (present) | 250% |
| $(Ce \cdot Tb)MgAl_{11}O_{19}$ (prior art) | 100% |
| $Y_3Al_5O_{12} : Tb$ (prior art) | 80% |
| $Y_{1.68}O_3 \cdot SiO_2 : Tb_{0.32}$ (prior art) | 55% |

The reason why the green ray-emitting phosphor of this invention has a high efficiency as seen from Table 5 above is that, because the rare earth silicate matrix of the phosphor is co-activated by Ce and Tb, said phosphor has an excitation spectrum noticeably different from that of the prior art green ray-emitting phosphor, namely, said excitation spectrum coincides in respect of peaks with the spectrum of exciting ultraviolet rays radiated from the high pressure mercury discharge lamp. The excitation spectrum of the phosphor of this invention has peaks, as indicated by a solid line A in FIG. 5, at wavelength of about 360 nm, about 305 nm and about 250 nm, and coincides in respect of peaks with the spectrum of exciting ultraviolet rays radiated from the high pressure mercury discharge lamp. In contrast, the excitation spectrum of the prior art green ray-emitting phosphor $Y_{1.68}O_3 \cdot SiO_2:Tb_{0.32}$ given in Table 3 has a peak, as indicated by a broken line B in FIG. 5, only at the wavelength of about 250 nm, thus displaying a considerable decline in efficiency.

The emission spectrum of the green ray-emitting phosphor of this invention has a main peak, as shown in FIG. 4, at the wavelength of about 543 nm, namely, indicates a spectrum attaining high visibility. This advantageous property contributes to the elevation of the brightness and in consequence efficiency of the high pressure mercury fluorescent lamp. The concentration of Ce in the green ray-emitting phosphor of this invention and the relative brightness of green rays emitted from the phosphor upon excitation by ultraviolet rays radiated from the high pressure mercury discharge lamp have a relationship set forth in FIG. 2B. The concentration of Tb in the green ray-emitting phosphor of the invention and the relative brightness of green rays emitted from the phosphor upon excitation by said ultraviolet rays have a relationship illustrated in FIG. 3. A relationship between the concentration of $SiO_2$ and the relative brightness of the phosphor in the case of excitation by ultraviolet rays radiated from the high pressure mercury discharge lamp is substantially the same as illustrated in FIG. 1.

Figure 8:
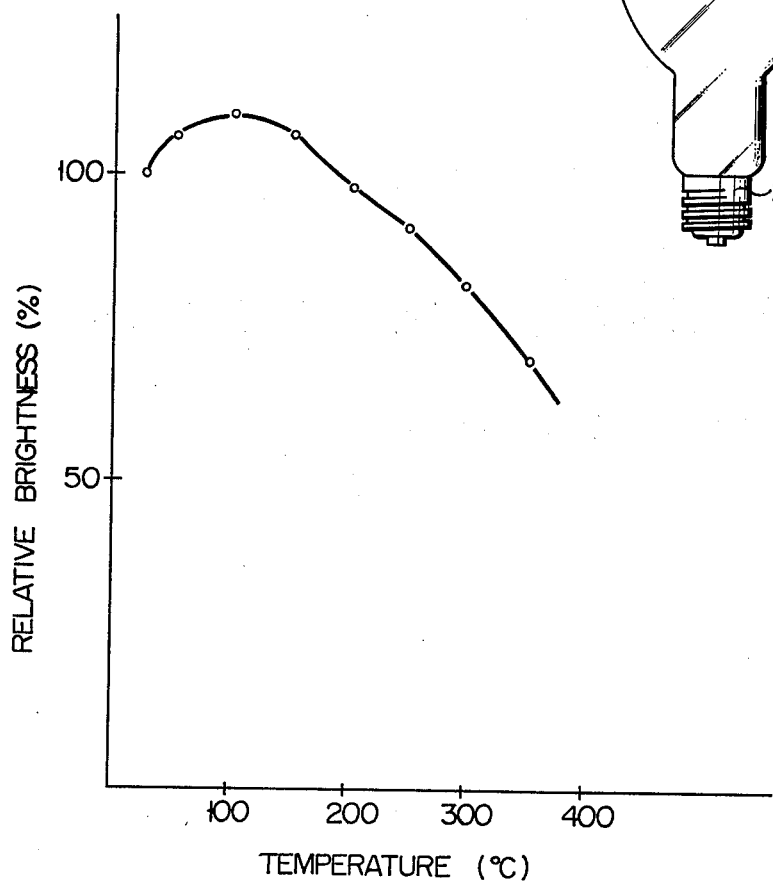
FIG. 8 is a graph showing the relationship between the ambient temperature and relative brightness of the phosphor of the invention.

The previously described second requirement relative to the temperature characteristic of the green ray-emitting phosphor is a very important factor, because the envelope bulb of the high pressure mercury fluorescent lamp is sometimes heated to as high a temperature as about 200° C. to about 300° C. Where the green ray-emitting phosphor of this invention is used at an ambient temperature of 200° to 300° C., the relative brightness of said phosphor is maintained at a higher level than 80 to 90% of that which is realized at room temperature. Therefore, the present phosphor has a property of fully withstanding the elevated temperature of the envelope bulb of the high pressure mercury fluorescent lamp. FIG. 8 illustrates the relationship between the above-mentioned temperature and the relative brightness of said phosphor. This relationship somewhat varies with the concentration of an activator, the composition of the matrix (ratio of $Ln_2O_3$ to $SiO_2$) or the kind of an element (Y, La, Gd or Lu) constituting the matrix. However, the phosphor of this invention, regardless of the composition, is saved from a noticeable decline in brightness at an ambient temperature of 200° to 300° C., and proves well adapted for use with a high pressure mercury fluorescent lamp.

Figure 9:
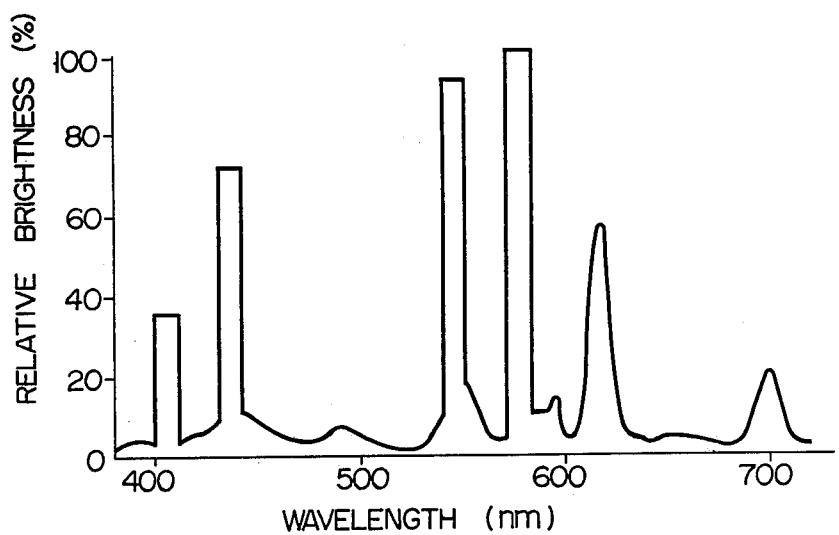
FIG. 9 is a spectrum of light emitted from a high pressure mercury fluorescent lamp provided with a phosphor layer formed of a red ray-emitting phosphor, a blue ray-emitting phosphor and a green ray-emitting phosphor embodying the invention.

Referring to the previously mentioned third requirement regarding visibility, the emission spectrum of the green ray-emitting phosphor of this invention coactivated by Ce and Tb has a peak at a wavelength of about 543 nm. This wavelength substantially coincides with that which ensures highest visibility. Where, therefore combined with the ordinary red ray-emitting phosphor having a maximum emission within wavelength range of 580 to 650 nm or further the ordinary blue ray-emitting phosphor having a maximum emission within wavelength range of 410 to 480 nm, the green ray-emitting phosphor of this invention provides a high pressure mercury fluorescent lamp of such high color rendering and efficiency as have not be realized in the past. FIG. 9 illustrates the emitted ray spectrum of a high pressure mercury fluorescent lamp whose phosphor layer is formed of a combination of the green ray-emitting phosphor of this invention and ordinary red and blue ray-emitting phosphor. The ordinary red ray-emitting phosphors include europium-activated yttrium vanadate $YVO_4$:Eu, europium-activated yttrium phosphovanadate $Y(P,V)O_4$:Eu, europium-activated yttrium phosphosilicon vanadate $Y(P,Si,V)O_4$:Eu, and europium-activated yttrium oxide $Y_2O_3$:Eu. All these ordinary phosphors emit red rays at a wavelength of about 620 nm. The ordinary blue ray-emitting phosphor includes europium-activated strontium chloroapatite $Sr_5(PO_4)_3Cl$:Eu, and europium-activated barium magnesium aluminate $BaMg_2Al_{16}O_{27}$:Eu. All these ordinary phosphors emit blue rays at a wavelength of about 450 nm.

It is desired that the green ray-emitting phosphor of this invention, red ray-emitting phosphor and, if desired, blue ray-emitting phosphor be blended in the proportions of 10 to 60% by weight, 30 to 90% by weight, and 0 to 40% by weight or preferably 5 to 40% by weight respectively.

There will now be described specific examples of a high pressure mercury fluorescent lamp using the green ray-emitting phosphor of this invention.

EXAMPLE 5

A high pressure mercury fluorescent lamp was manufactured by the conventional process whose phosphor layer was formed of a 50% by weight of green ray-emitting phosphor $Y_{1.66}O_3 \cdot SiO_2$:$Ce_{0.02}$.$Tb_{0.32}$ and 50% by weight of a red ray-emitting phosphor $Y(P,V)O_4$:Eu. This fluorescent lamp indicated an efficiency of 71 lm/w and a general color rendering Ra of 55, proving that the efficiency increased by 7 lm/w and the color rendering was also improved, as compared with those of the prior art high pressure mercury fluorescent lamp. Where the green ray-emitting phosphor $Y_{1.66}O_3.SiO_2$:$Ce_{0.02}$.$Tb_{0.32}$ was replaced by another rare earth silicate phosphor embodying this invention, the properties of the resultant fluorescent lamp were similarly elevated, as seen from Table 6 below which also gives data on the prior art fluorescent lamp.

Table 6

| Green ray-emitting phosphor used | Efficiency (lm/w) | General color rendering Ra |
|---|---|---|
| $Y_2SiO_5 : Ce_{0.02} . Tb_{0.32}$ | 71 | 55 |
| $Gd_2SiO_5 : Ce_{0.02} . Tb_{0.32}$ | 65 | 55 |
| $La_2SiO_5 : Ce_{0.02} . Tb_{0.32}$ | 66 | 54 |
| $Lu_2SiO_5 : Ce_{0.02} . Tb_{0.32}$ | 70 | 55 |
| $Y_{1.66}O_3 . 2SiO_2 : Ce_{0.02} . Tb_{0.32}$ | 68 | 53 |
| $Gd_{1.66}O_3 . 2SiO_2 : Ce_{0.02} . Tb_{0.32}$ | 65 | 54 |
| $La_{1.66}O_3 . 2SiO_2 : Ce_{0.02} . Tb_{0.32}$ | 66 | 50 |
| $(Ce . Tb)MgAl_{11}O_{19}$ (prior art) | 64 | 49 |

The first four phosphors of Table 6 above are monosilicides. A subscript "2" attached to the foremost rare earth components Y, Gd, La and Lu of the respective phosphors means that a total of mol of all the rare earth elements included in the respective monosilicide phosphors amount to 2 mols. Let us take the example of the first phosphor. When said phosphor is rewritten into a composition formula $Y_2SiO_5$:$Ce_{0.05}$.$Tb_{0.32}$, the subscript 2 attached to Y means 1.66. (The same applies to Table 7 below.) In consideration of efficiency and color rendering, it is advised that the green ray-emitting phosphor and red ray-emitting phosphor be blended in the proportions of 10 to 60% by weight for green and 90 to 40% by weight for red. If the green ray-emitting phosphor is applied in a smaller amount than 10% by weight, the efficiency falls. If the proportion of said phosphor exceeds 60% by weight, the color rendering decreases, though the efficiency may increase. Application of, for example, the red ray-emitting phosphor $YVO_4$:Eu in place of the similar phosphor $Y(P,V)O_4$:Eu used in Concrete Example 1 also attains high efficiency and color rendering.

EXAMPLE 6

A high pressure mercury fluorescent lamp was manufactured by the conventional process with the phosphor layer formed of a mixture of 45% by weight of a green ray-emitting phosphor $Y_2SiO_5$:$Ce_{0.02}$.$Tb_{0.32}$, 45% by weight of a red ray-emitting phosphor $Y(P,V)O_4$:Eu, 10% by weight of a blue ray-emitting phosphor $Sr_5(PO_4)_3Cl$:Eu.

As compared with the prior art high pressure mercury fluorescent lamp, the high pressure mercury fluorescent lamp of this invention indicated an efficiency of 68 lm/w, an increase of 6 lm/w and a far more improved general color rendering Ra of 58.

The high pressure mercury fluorescent lamp of the invention had an emitted ray spectrum illustrated in FIG. 9. Replacement of the green ray-emitting phosphor $Y_2SiO_5$:$Ce_{0.02}$.$Tb_{0.32}$ by any other rare earth silicate phosphor of this invention enabled the fluorescent lamp to display as high efficiency and color rendering as in Concrete Example 2. The properties of high pressure mercury fluorescent lamps are set forth in Table 7 below in comparison with those of the prior art type.

Table 7

| Green ray-emitting phosphor used | Efficiency (lm/w) | General color rendering Ra |
|---|---|---|
| $Y_2SiO_5 : Ce_{0.02} . Tb_{0.32}$ | 68 | 58 |
| $Gd_2SiO_5 : Ce_{0.02} . Tb_{0.32}$ | 64 | 58 |
| $La_2SiO_5 : Ce_{0.02} . Tb_{0.32}$ | 66 | 56 |
| $Y_{1.66}O_3 . 2SiO_2 : Ce_{0.02} . Tb_{0.32}$ | 68 | 57 |
| $Gd_{1.66}O_3 . 2SiO_2 : Ce_{0.02} . Tb_{0.32}$ | 65 | 55 |
| $La_{1.66}O_3 . 2SiO_2 : Ce_{0.02} . Tb_{0.32}$ | 65 | 56 |

Table 7-continued

| Green ray-emitting phosphor used | Efficiency (lm/w) | General color rendering Ra |
|---|---|---|
| (Ce . Tb)MgAl$_{11}$O$_{19}$ (prior art) | 62 | 53 |

In consideration of efficiency and color-rendering, a blue ray-emitting phosphor, for example, Sr$_5$(PO$_4$)$_3$Cl:Eu should preferably be blended at the rate of 5 to 40% by weight. A higher proportion than 5% by weight of said phosphor enables the resultant high pressure mercury fluorescent lamp to project a far more distinct color on to an illuminated subject. However, application of a larger amount of said phosphor than 40% by weight conversely leads to a decline in the efficiency of said fluorescent lamp. This blue ray-emitting phosphor may be replaced with the same advantageous effect by any other similar phosphor, such as BaMg$_2$Al$_{16}$O$_{27}$:Eu.

What we claim is:

1. In a low pressure mercury fluorescent lamp provided with a phosphor layer formed of a first phosphor emitting blue rays having a maximum emission within wavelength range of 430 to 490 nm, a second phosphor emitting green rays having a maximum emission within wavelength range of 520 to 590 nm and a third phosphor emitting red rays having a maximum emission within wavelength range of 590 to 640 nm, the improvement being that the second phosphor emitting green rays has a composition expressed by the general formula:

$$Ln_{2(1-x-y)}O_3 . zSiO_2 : Ce_{2x} . Tb_{2y}$$

where;
Ln is at least one rare earth element selected from the group consisting of yttrium, lanthanum, gadolinium and lutetium,
x is $1 \times 10^{-3}$ to $3 \times 10^{-1}$ gram atom per gram atom of the total amount of all the rare earth elements,
y is $3 \times 10^{-2}$ to $3 \times 10^{-1}$ gram atom per gram atom of the total amount of all the rare earth elements,
z is 0.8 to 2.2 mol per mol of a rare earth oxide
and efficiently emits green rays when excited by ultraviolet rays.

2. The low pressure mercury fluorescent lamp according to claim 1, wherein the phosphor layer is formed of 5 to 30% by weight of the first phosphor, 10 to 60% by weight of the second phosphor and 20 to 80% by weight of the third phosphor.

3. The low pressure mercury fluorescent lamp according to claim 1, wherein the first phosphor is at least one member selected from the group consisting of Sr$_5$(PO$_4$)$_3$Cl:Eu, Ba$_x$Mg$_{(2-x)}$Al$_{16}$O$_{27}$:Eu and Sr$_x$Mg$_{(2-x)}$Al$_{16}$O$_{27}$:Eu, where x is 0.5 to 1.5.

4. The low pressure mercury fluorescent lamp according to claim 1, wherein the third phosphor has a composition expressed by the general formula:

$$Ln_2O_3 : Eu$$

where Ln denotes at least one member of the group consisting of yttrium, lanthanum, gadolinium and lutetium.

5. In a high pressure mercury fluorescent lamp provided with a phosphor layer formed of a phosphor emitting green rays having a maximum emission within wavelength range of 520 to 590 nm and a phosphor emitting red rays having a maximum emission within wavelength range of 580 to 650 nm, the improvement being that the green ray-emitting phosphor has a composition expressed by the general formula:

$$Ln_{2(1-x-y)}O_3 . zSiO_2 : Ce_{2x} . Tb_{2y}$$

where;
Ln is at least one rare earth element selected from the group consisting of yttrium, lanthanum, gadolinium and lutetium,
x is $1 \times 10^{-3}$ to $3 \times 10^{-1}$ gram atom per gram atom of the total amount of all the rare earth elements,
y is $3 \times 10^{-2}$ to $3 \times 10^{31}$ $^1$ gram atom per gram atom of the total amount of all the rare earth elements,
z is 0.8 to 2.2 mol per mol of a rare earth oxide
and efficiently emits green rays when excited by ultraviolet rays.

6. The high pressure mercury fluorescent lamp according to claim 5, wherein the phosphor layer is prepared from 10 to 60% by weight of the green ray-emitting phosphor and 90 to 40% by weight of the red ray-emitting phosphor.

7. The high pressure mercury fluorescent lamp according to claim 5, wherein the phosphor layer additionally contains a phosphor emitting blue rays having a maximum emission within wavelength range of 410 to 480 nm.

8. The high pressure mercury fluorescent lamp according to claim 7, wherein the blue ray-emitting phosphor is at least one member selected from the group consisting of Sr$_5$(PO$_4$)$_3$Cl:Eu and BaMg$_2$Al$_{16}$O$_{27}$:Eu.

9. The high pressure mercury fluorescent lamp according to claim 5, wherein the phosphor layer is formed of 30 to 90% by weight of the red ray-emitting phosphor, 10 to 60% by weight of the green ray-emitting phosphor and 5 to 40% by weight of the blue ray-emitting phosphor.

10. The high pressure mercury fluorescent lamp according to claim 5, wherein the red ray-emitting phosphor is at least one member selected from the group consisting of a europium-activated yttrium vanadate YVO$_4$:Eu, a europium-activated yttrium phosphoranadate Y(P,V)O$_4$:Eu a europium-activated yttrium phosphosilicon vanadate Y(P,Si,V)O:Eu and a europium-activated yttrium oxide Y$_2$O$_3$:Eu.

11. In a single green ray-emitting low pressure mercury fluorescent lamp for use with an electronic copying apparatus which is provided with a phosphor layer only formed of a phosphor emitting green rays having a maximum emission within wavelength range of 520 to 590 nm, the improvement being that the green ray-emitting phosphor has a composition expressed by the general formula:

$$Ln_{2(1-x-y)}O_3 . zSiO_2 : Ce_{2x} . Tb_{2y}$$

where;
Ln is at least one rare earth element selected from the group consisting of yttrium, lanthanum, gadolinium and lutetium,
x is $1 \times 10^{-3}$ to $3 \times 10^{-1}$ gram atom per gram atom of the total amount of all the rare earth elements,
y is $3 \times 10^{-2}$ to $3 \times 10^{-1}$ gram atom per gram atom of the total amount of all the rare earth elements,
z is 0.8 to 2.2 mol per mol of a rare earth oxide
and efficiently emits green rays when excited by ultraviolet rays.

12. In a low pressure mercury fluorescent lamp provided with a phosphor layer formed of a first phosphor emitting blue rays having a maximum emission width within the wavelength of 430 to 490 nm, a second phosphor emitting green rays having a maximum emission within the wavelength range of 520 to 590 nm and a third phosphor emitting red rays having a maximum emission within the wavelength range of 590 to 640 nm the improvement wherein the second phosphor emitting green rays has a composition expressed by the general formula:

$$Ln_{2(1-x-y)}O_3 \cdot zSiO_2:Ce_{2x} \cdot Tb_{2y}$$

where;
Ln is at least one rare element selected from the group consisting of yttrium, lanthanum, gadolinium and lutetium,
x is $1 \times 10^{-3}$ to $3 \times 10^{-1}$ gram atom per gram atom of the total amount of all the rare earth elements,
y is $3 \times 10^{-2}$ to $3 \times 10^{-1}$ gram atom per gram atom of the total amount of all the rare earth elements,
z is 0.8 to 2.2 mol per mol of a rare earth oxide,
and wherein the excitation spectrum of said green emitting phosphor has peaks at wavelengths of about 250 nm, about 305 nm and said phosphor efficiently emits green rays when excited by ultraviolet rays.

13. In a high pressure mercury fluorescent lamp provided with a phosphor layer formed of a phosphor emitting green rays having a maximum emission within the wavelength rays of 520 to 590 nm and a red ray emitting phosphor, having a maximum emission within the wavelength range of 580 to 650 nm,
the improvement wherein the green ray-emitting phosphor has a composition expressed by the general formula:

$$Ln_{2(1-x-y)}O_3 \cdot zSiO_2:Ce_{2x} \cdot Tb_{2y}$$

where;
Ln is at least one rare earth element selected from the group consisting of yttrium, lanthanum, gadolinium and lutetium,
x is $1 \times 10^{-3}$ to $3 \times 10^{-1}$ gram atom per gram atom of the total amount of all the rare earth elements,
y is $3 \times 10^{-2}$ to $3 \times 10^{-1}$ gram atom per gram atom of the total amount of all the rare earth elements,
z is 0.8 to 2.2 mole per mol of a rare earth oxide,
wherein the excitation spectrum of said green emitting phosphor has peaks at wavelengths of about 250 nm about 305 nm and about 360 nm and said phosphor efficiently emits green rays when excited by ultraviolet rays.

* * * * *